US006911055B2

(12) United States Patent
Baillet

(10) Patent No.: US 6,911,055 B2
(45) Date of Patent: Jun. 28, 2005

(54) METHOD FOR COLORING A TRANSPARENT ARTICLE MADE OF POLYCARBONATE AND RESULTING ARTICLE

(75) Inventor: Gilles Baillet, Paris (FR)

(73) Assignee: Essilor International Compagnie General d'Optique, Charenton cedex (FR)

( * ) Notice: Subject to any disclaimer, the term of this patent is extended or adjusted under 35 U.S.C. 154(b) by 0 days.

(21) Appl. No.: 10/844,045

(22) Filed: May 12, 2004

(65) Prior Publication Data

US 2004/0265572 A1 Dec. 30, 2004

Related U.S. Application Data

(63) Continuation of application No. 09/974,399, filed on Oct. 9, 2001, now abandoned, which is a continuation of application No. PCT/FR00/00792, filed on Mar. 30, 2000.

(30) Foreign Application Priority Data

Apr. 8, 1999 (FR) .......................................... 99 04409

(51) Int. Cl.[7] .................................................. D06P 5/20
(52) U.S. Cl. ............................ 8/444; 8/115.53; 8/589; 8/930; 8/933; 8/506; 427/457; 427/500; 427/503; 427/508; 427/532; 427/558
(58) Field of Search .............................. 8/115.53, 444, 8/506, 589, 930, 933; 427/457, 500, 503, 550.8; 351/162, 177

(56) References Cited

U.S. PATENT DOCUMENTS

| 3,567,605 A | 3/1971 | Becker ........................ 204/158 |
| 4,211,823 A | 7/1980 | Suzuki et al. ................ 428/412 |
| 5,015,523 A | 5/1991 | Kawashima et al. ........ 428/336 |
| 5,066,818 A | 11/1991 | Gemert et al. ............... 549/389 |
| 5,114,621 A | 5/1992 | Guglielmetti et al. ........ 252/586 |
| 5,139,707 A | 8/1992 | Guglielmetti et al. ........ 252/586 |
| 5,316,791 A | 5/1994 | Farber et al. ................ 427/464 |
| 5,443,597 A | 8/1995 | Kitchloo et al. ................ 8/444 |

FOREIGN PATENT DOCUMENTS

| EP | 0245020 | 11/1987 |
| EP | 0388660 | 9/1990 |
| EP | 0401958 | 12/1990 |
| EP | 0404111 | 12/1990 |
| EP | 0562915 | 9/1993 |
| EP | 0615144 | 9/1994 |
| EP | 0680492 | 11/1995 |
| FR | 2688782 | 9/1993 |
| FR | 2702486 | 9/1994 |
| JP | 57 133286 | 8/1982 |

(Continued)

OTHER PUBLICATIONS

Rivaton, "Photovieillissement: evaluation des sources lumineuses (Photo–ageing: evaluation of light sources)," *Caoutchoucs et Platiques*, 651:81–85, 1985.

Rivaton et al., "Photo–aging: evaluation of light sources," (English translation), Caoutchoucs et Platiques, 651:81–85, 1985.

Ueda et al., "Physico–chemical modifications of fibres and their effect on coloration and finishing," *Rev. Prog. Coloration*, 26:9–19, 1996.

Primary Examiner—Margaret Einsmann
(74) Attorney, Agent, or Firm—Fulbright & Jaworski L.L.P.

(57) ABSTRACT

The invention concerns a method which comprises irradiating at least one face of an article with UV radiation, causing the article to be photodegraded over a thickness of at least 1 μm and contacting the irradiated face of the article with a coloring agent, so as to diffuse the coloring agent in the entire thickness of the photodegraded surface layer of the article. The invention is useful for optical and ophthalmologic articles.

32 Claims, 2 Drawing Sheets

FOREIGN PATENT DOCUMENTS

Figure 1:
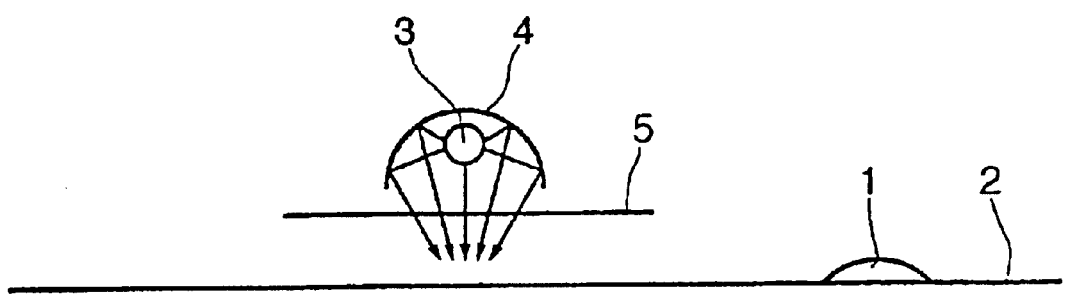

| | | |
|---|---|---|
| JP | 62 050336 | 3/1987 |
| JP | 63-87223 | 4/1988 |
| JP | 63-141001 | 6/1988 |
| JP | 01 118682 | 5/1989 |
| JP | 04 353529 | 12/1992 |
| WO | WO 90/07507 | 7/1990 |
| WO | WO 92/09593 | 6/1992 |
| WO | WO 93/17071 | 9/1993 |
| WO | WO 96/04590 | 2/1996 |

METHOD FOR COLORING A TRANSPARENT ARTICLE MADE OF POLYCARBONATE AND RESULTING ARTICLE

This application is a continuation of U.S. patent application Ser. No. 09/974,399 filed Oct. 9, 2001, now abandoned which is a continuation of International Application No. PCT/FR00/00792 filed Mar. 30, 2000, which claims priority to French Application No. 99/04409 filed Apr. 8, 1999. The entire contents of each of the foregoing applications is incorporated herein by reference.

The present invention concerns in general terms a method for colouring a transparent polycarbonate article, for example an optical or ophthalmic article, and in particular a lens.

It is known that polycarbonate (PC) is a difficult material to colour.

Ophthalmic lenses made from conventional organic material, such as the material obtained by polymerisation of diethylene glycol diallyl carbonate, are generally coloured by dipping in aqueous baths of dispersed dyes, the baths being maintained at a temperature of the order of 95° C.

Such a process is not directly adaptable to colouring polycarbonate articles, for example a polycarbonate lens.

Various techniques have been proposed for colouring a polycarbonate article, such as the application to the surface of the PC article of solutions of pigments in an organic solvent which is capable of partially dissolving or swelling the polycarbonate on the surface, so as to allow the pigment to penetrate under the surface of the article.

These methods, which are aggressive to the surface of the treated article, are not suitable for ophthalmic application.

In addition, given the international directives aiming at the reduction in organic solvents, the use of such methods is undesirable.

The document U.S. Pat. No. 5,443,597 discloses a method for colouring an article, such as an optical component, formed from a polycarbonate-polyester copolymer, which comprises subjecting the copolymer to a UV irradiation of predetermined intensity, for a predetermined time, then subjecting the article to a colouring treatment, for example by dipping in an aqueous solution of a dye.

According to this document, the presence of polyester links in the copolymer skeleton is essential since it is the polyester bond which is broken by the irradiation and which allows the subsequent penetration of the dye.

In addition, the depths of penetration of the pigments are small, about 10 to 15 nm. To obtain larger penetrations, the document teaches that the copolymer must then contain a higher proportion of polyester.

The majority of the polycarbonate materials used for ophthalmic optics are homopolycarbonate materials.

It would thus be desirable to have a method for simple coloration of polycarbonate articles, in particular homopolycarbonate, for example optical and ophthalmic articles such as lenses, which uses conventional dyes in the aqueous phase.

In addition, this method, particularly intended for colouring PC ophthalmic lenses, and in particular spectacle lenses, must not only be simple but also give the coloration desired by the customer.

The method must allow variable intensity of coloration: shade A (light), shade B (medium), shade C (dark).

The method must not significantly alter the essential properties of the lens such as transparency, resistance to shock and to scratches.

The colour obtained must be stable over time.

We have now found that it is possible to cause, by means of an appropriate irradiation, a photodegradation over a predetermined depth of one face of a polycarbonate article which does not contain polyester groups, without significantly changing the other optical and mechanical properties required, in particular for an ophthalmic optics application.

A PC article thus treated may be coloured with ease, in particular by means of dispersions and aqueous solutions of dyes and pigments.

According to the invention, the method for colouring a transparent article made of polycarbonate not containing polyester groups comprises:

a) the photodegradation of the polycarbonate material of the transparent article by irradiation of at least one first face of the article with a predetermined UV radiation, to produce in the article at least one first photodegraded surface layer of the polycarbonate material with a thickness of at least 1 to 2 $\mu$m; and b) placing in contact at least said first face of the article with a colouring agent so as to diffuse the colouring agent within a thickness of at least 1 to 2 $\mu$m of the first photodegraded surface layer.

The method of the invention may obviously also comprise the irradiation of the article to provoke the photodegradation of the polycarbonate material on two opposite faces of the article (each of the faces being subjected to the photodegradation), thus forming two photodegraded surface layers of the polycarbonate material of the article, each having a thickness of at least 1 to 2 $\mu$m.

In this latter case, the two faces of the article are then placed in contact with the colouring agent so as to diffuse the colouring agent within a thickness of at least 1 to 2 $\mu$m for each of the two photodegraded surface layers.

The thickness of the photodegraded surface layer or the photodegraded surface layers is preferably from 2 to 20 $\mu$m, and better 2 to 10 $\mu$m.

The colouring agent may be diffused throughout the entire thickness of the photodegraded surface layer or layers.

The UV radiation of the step of photodegradation by irradiation preferably has a wavelength such that, during the irradiation, at least 50%, preferably at least 60%, and even more preferably at least 65% of the energy of the irradiation originates from the part of the radiation with wavelength $\leq 320$ nm. Also preferably, the energy of the irradiation of the article due to the part of the UV radiation with wavelength $\leq 320$ nm is from 2.4 to 48 J/cm$^2$, preferably 10 to 30 J/cm$^2$, while the energy of the irradiation of the article due to the part of the UV radiation with wavelength >320 nm is from 0.9 J/cm$^2$ to 15 J/cm$^2$, and better from 2 J/cm$^2$ to 8 J/cm$^2$. (As is well known, UV radiation has a wavelength range from 200 to 400 nm).

During the photodegradation step, the time during which each point of one of the faces is subjected to the irradiation is less than 10 minutes, preferably less than 2 minutes and even more preferably less than 30 seconds.

The optimal duration of the photodegradation step during which the energies listed above are received by the lens vary from 0.1 to 10 seconds, generally and preferably from 0.4 to 4 seconds.

The modification of the chemical structure of the surface of the PC can be shown by infrared spectroscopy in ATR (Attenuated Total Reflectance) mode at an angle of 45°. This surface technique can be used to characterize the structure of PC over a depth of 1 to 2 $\mu$m.

In comparison with the nondegraded PC surface, there is an increase in the intensity of the stretching (elongation)

bands of the OH groups (alcohols, acids, hydroperoxides) revealing the photooxidation process.

The UV radiation suitable for the method of the invention may be obtained, for example, by using a UV "H" lamp from the FUSION UV SYSTEM Company at 50% of its nominal power or a UV "D" lamp from the same Company at 40% of its nominal power.

The article "Photoviellissement: évaluation des sources lumineuses (Photo-ageing:evaluation of light sources)", Agnès RIVATON, Jean-Luc GARDETTE and Jacques LEMAIRE, Caoutchoucs et Plastiques n° 651—May 1985, pages 81 to 85, shows that the photo-ageing of bisphenol-A polycarbonate has a double photochemistry, i.e. an "intrinsic" photochemistry (surface attack) and an "induced" photochemistry associated with the excitation of defects and impurities (attack in depth).

Without wishing to be constrained by a theory, one may suppose that to form the photodegraded surface layers according to the invention, the UV irradiation of the polycarbonate article must be such that the photo-ageing essentially proceeds according to an "intrinsic" photochemistry, i.e. surface attack. One can thus obtain a polycarbonate article with a photodegraded surface layer improving its suitability for colouring without adversely affecting the other optical and mechanical properties of the polycarbonate material.

Any polycarbonate not containing polyester groups is suitable for the present invention.

In the context of the present invention, polycarbonate should be understood to include the homopolycarbonates and the copolycarbonates and sequenced copolycarbonates, with the proviso that copolycarbonates containing polyester groups are excluded.

These polycarbonates are commercially available, for example from the Companies GENERAL ELECTRIC COMPANY under the trade name LEXAN®, TEIJIN under the trade name PANLITE®, BAYER under the trade name BAYBLEND®, MOBAY CHEMICAL Corp. under the trade name MAKROLON® and DOW CHEMICAL Co. under the trade name CALIBRE®.

The preferred polycarbonates are the homopolycarbonates, in particular the homopolycarbonates of bisphenol-A and of tetramethyl-3,5-bisphenol-A (TMBPA).

The polycarbonate material preferably contains an effective quantity of a UV absorber.

UV absorbers are adjuvants which are well known in the polymer field and are commercially available.

These UV absorbers include the benzotriazoles, the benzophenones, the dihydroxybenzophenones, the benzimidazoles and the phenyl benzoates.

The benzotriazoles include the benzotriazoles of formula:

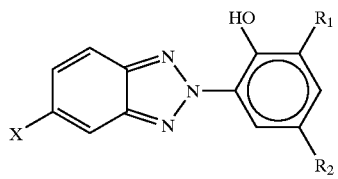

where
$R_1$ represents H or an alkyl radical, preferably $C_1$–$C_6$
$R_2$ represents H or an alkyl radical, preferably $C_1$–$C_8$, and
X represents H or Cl.

The benzophenones include compounds of formula:

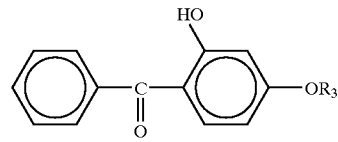

where $R_3$ is an alkyl radical, preferably $C_1$–$C_{13}$.

The dihydroxybenzophenones include compounds of formula:

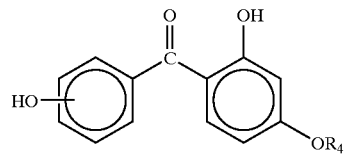

where $R_4$ is an alkyl radical, preferably $C_1$–$C_8$.

The phenyl benzoates include compounds of formula:

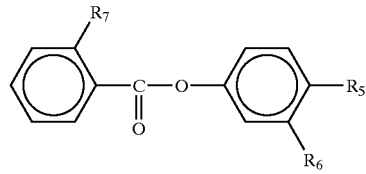

where $R_5$ represents H or an alkyl radical, preferably $C_1$–$C_4$, and
$R_6$ and $R_7$ represent H or OH.

The proportion of UV absorber in the polycarbonate material generally varies from 0 to 10% by weight with respect to the total weight of the material, preferably from 0 to 5%, and more preferably about 2.5% by weight.

The polycarbonate material may contain any other conventionally used adjuvant which does not impair the optical properties of the material, such as antioxidants, internal or external lubricants, flame retardants and antistatic agents in their usual proportions.

In the step of colouring the article according to the invention, any dye or pigment conventionally used for colouring transparent polymer articles may be used, including photochromic dyes and pigments.

A UV absorber may also be diffused at this stage.

The conventionally used dyes include the azo dyes and the anthraquinone dyes.

The azo dyes may include monoazo dyes, for example of formula:

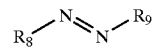

where $R_8$ and $R_9$ are aryl or heterocyclic radicals, preferably heterocyclic, or diazo dyes, for example of formula:

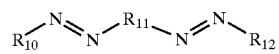

where $R_{10}$, $R_{11}$, and $R_{12}$ are aryl or heterocyclic radicals, preferably heterocyclic.

The anthraquinone dyes may be represented by the formula:

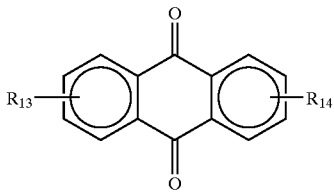

where $R_{13}$ and $R_{14}$ represent H, OH, an amino group, an alkoxy group, a fluorocarbon group or an acylamino group.

Other dyes may be infrared absorbers or laser dyes.

The infrared absorbers include the following compounds:

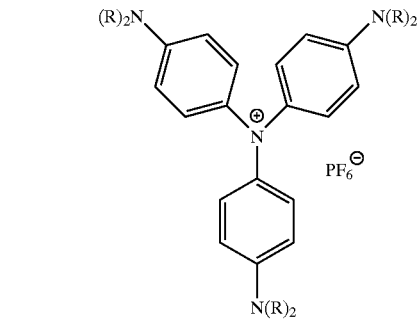

Trisarylaminium

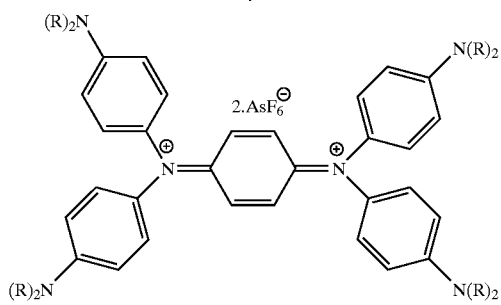

Tetrakisaryldiimonium in which R represents H or an alkyl, preferably $C_1$–$C_4$.

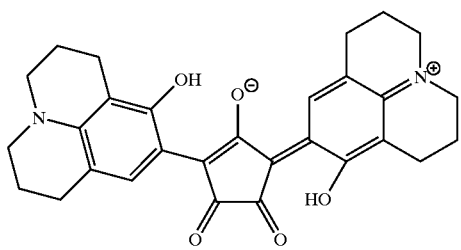

Croconium

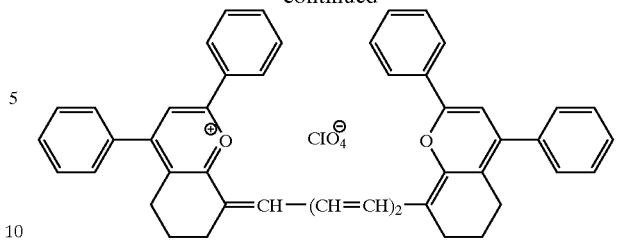

Pyrilium

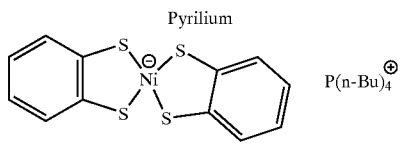

Nickel Dithiolate

The laser dyes include dyes containing one or more chromophores selected from one or more porphyrin complexes modified by metals to form metal porphyrin complexes.

Examples of suitable chromophores are vanadyl t-butylated phthalocyanine and tin chloride phthalocyanine which absorb at a wavelength of 694 nm and are thus suitable for protection against a ruby laser.

The photochromic dyes and pigments include the spirooxazines and the chromenes.

Photochromic dyes and pigments of the spirooxazine type are described, amongst others, in the patents and patent applications U.S. Pat. No. 5,139,707, U.S. Pat. No. 5,114,621, EP-0 245 020, EP-03 88 660 and WO 96/04590.

Photochromic dyes and pigments of the chromene type are described, amongst others, in the patents and patent applications WO 90/07507, WO 92/09593, WO 93/17071, FR 2 688 782, EP401958, EP-562915, U.S. Pat. No. 3,567,605 and U.S. Pat. No. 5,066,818.

The preferred dyes and pigments are the azo and anthraquinone dyes and pigments.

The step of colouring the article consists of placing the face corresponding to the photodegraded surface layer of the polycarbonate article in contact with a colouring agent, for example in the form of a solution or dispersion of one or more dyes or pigments, using entirely conventional methods such as dipping in a colouring bath or by centrifugal deposit of a colouring solution on the photodegraded face of the article.

The contact of the photodegraded face of the article with the colouring agent is preferably carried out by dipping in a colouring bath.

The colouring baths and solutions are conventionally aqueous solutions and dispersions of a dye or a pigment or mixtures of dyes and pigments.

These baths and solutions preferably also contain an effective quantity of a surface-active agent, in particular an alkyl benzene sulfonate. The proportion of surface-active agent in the baths or solutions generally varies from 0 to 3%, preferably 0.2% by weight.

The temperature of the colouring baths and solutions, during the colouring step, is generally between 85 and 100° C., in general about 94 to 95° C.

After the colouring treatment, the articles are preferably subjected to a thermal treatment to stabilize the coloration, at a temperature preferably higher than 100° C. and possibly reaching 140° C., preferably about 130° C., for a sufficient time to fix the coloration, generally 1 hour or more, preferably about 2 hours.

After the colouring treatment and the optional thermal stabilization treatment, it is possible in the method of the invention to proceed to other conventional deposits on the faces of the article, of primer, hard anti-abrasion and anti-reflection coatings.

Given the high impact strength of polycarbonates, the primer coats serve essentially as tack coats to improve the adhesion of the hard anti-abrasion coatings on the article.

It has also been found that depositing such primer coats on the photodegraded faces of the articles suppresses the surface defects and possible loss of adhesion due to the photodegradation or other causes.

Any primer composition conventionally used for transparent polymer articles, such as ophthalmic lenses, may be used in the method of the invention, in particular conventional shockproof primer layers.

Preferred primer compositions include compositions based on thermoplastic polyurethanes, such as those disclosed in the Japanese patents 63-141001 and 63-87223, poly(meth)acrylic primer compositions, such as those disclosed in the patent U.S. Pat. No. 5,015,523, compositions based on thermosetting polyurethanes, such as those disclosed in the patent EP-0404111 and compositions based on poly(meth)acrylic latexes and polyurethane latexes, such as those disclosed in the patents U.S. Pat. No. 5,316,791 and EP-0680492, WO 98/02376.

The preferred primer compositions are the compositions based on polyurethanes and compositions based on latexes, particularly the polyurethane latexes.

The poly(meth)acrylic latexes are latexes of copolymers mainly consisting of a (meth)acrylate, such as for example ethyl, butyl, methoxy or ethoxyethyl (meth)acrylate, with a generally smaller proportion of at least one other comonomer, such as for example styrene.

The preferred poly(meth)acrylic latexes are acrylate-styrene copolymer latexes.

Such acrylate-styrene copolymer latexes are commercially available from the Company ZENECA RESINS under the trade name NEOCRYL®.

Polyurethane latexes are also known and commercially available.

Examples of polyurethane latexes include those containing polyester groups. Such latexes which are commercially available include NEOREZ® from the Company ZENECA RESINS and WITCOBOND® from the Company BAXENDEN CHEMICAL.

Mixtures of these latexes, in particular of polyurethane latex and poly(meth)acrylic latex, may also be used as primers.

These primer compositions may be deposited on the faces of the article by dipping or centrifugation, then dried at a temperature of at least 70° C. and up to 100° C., preferably of the order of 90° C., for a time ranging from 2 minutes to 2 hours, generally of the order of 15 minutes, to form primer layers with thicknesses, after baking, of 0.2 to 2.5 $\mu$m, preferably 0.5 to 1.5 $\mu$m.

The method of the invention also includes the formation of a layer of a hard anti-abrasion coating on the faces of the article, in particular the photodegraded face of the article, preferably coated with a primer coat.

To form this hard anti-abrasion coating, any composition conventionally used for this purpose, in particular in the ophthalmic optics field, may be used.

Preferred compositions for hard anti-abrasion coating include compositions based on poly(meth)acrylate and compositions based on alkoxysilane hydrolysate, in particular epoxysilane hydrolysate, such as those disclosed in the French patent 93 02649 and the patent U.S. Pat. No. 4,211,823.

A preferred composition for hard anti-abrasion coating comprises a hydrolysate of epoxysilane and of dialkyldialkoxysilane, a colloidal filler, such as colloidal silica, $TiO_2$ or $Sb_2O_5$ and a catalyst, preferably an aluminium chelate, such as aluminium acetylacetonate, the remainder consisting essentially of solvents conventionally used for the formulation of such compositions.

The hydrolysate used is preferably a hydrolysate of -glycidyloxypropyl trimethoxysilane (GLYMO) and dimethyl diethoxysilane (DMDES).

An example of such a composition is obtained by hydrolysis of a mixture of 224 parts by weight of GLYMO and 120 parts of DMDES, to which is added 718 parts by weight of colloidal silica 30% in methanol, 15 parts of aluminium acetylacetonate and 44 parts of ethylcellosolve.

In the case of a hard anti-abrasion coating composition based on poly(meth)acrylate, the primer coat is not necessary to adhere the anti-abrasion coating.

The thickness of the anti-abrasion coating is generally between 1 and 10 $\mu$m and more particularly between 2 and 6 $\mu$m.

In contrast, such a primer coat is in practice necessary in the case of an anti-abrasion coating based on epoxysilane hydrolysate.

The method of the invention may also include the formation of an anti-reflection layer on the hard anti-abrasion coating layer.

As an example, the anti-reflection coating may be composed of a mono- or multilayer film, of dielectric materials such as SiO, $SiO_2$, $Si_3N_4$, $TiO_2$, $ZrO_2$, $Al_2O_3$, $MgF_2$ or $Ta_2O_5$, or their mixtures. It is thus possible to prevent the appearance of a reflection at the lens-air interface.

This anti-reflection coating is generally applied by vacuum deposit according to one of the following techniques:

1/ by evaporation, optionally assisted by ion beam;
2/ by ion-beam spraying;
3/ by cathodic spraying;
4/ by chemical deposit in the vapour phase assisted by plasma.

In addition to vacuum deposit, it is also possible to deposit an inorganic layer by the sol/gel route (for example from tetraethoxysilane hydrolysates).

In the case where the film consists of a single layer, its optical thickness must be equal to $\lambda/4$ where $\lambda$ is a wavelength between 450 and 650 nm.

In the case of a multilayer film comprising three layers, a combination may be used corresponding to the respective optical thicknesses $\lambda/4$-$\lambda/2$-$\lambda/4$ or $\lambda/4$-$\lambda/4$-$\lambda/4$.

It is also possible to use an equivalent film formed by more layers, in the place of any number of the layers which are part of the above three layers.

The invention also concerns transparent polycarbonate articles, such as optical glasses or lenses, with two opposite principal faces and comprising at least one photodegraded surface layer on one of the principal faces with a thickness of at least 1 $\mu$m, generally from 2 to 20 $\mu$m, and preferably 2 to 10 $\mu$m, in the entire thickness of which is dispersed a colouring agent.

The article preferably comprises two photodegraded surface layers on the two opposite principal faces of the article, each having a thickness of at least 1 $\mu$m, generally from 2 to 20 $\mu$m, and preferably 2 to 10 $\mu$m, in which is dispersed the colouring agent.

The article may be coated on one or two faces with a primer coat, a hard anti-abrasion coating and optionally an anti-reflection coating, as described above with respect to the method of the invention.

Figure 2:
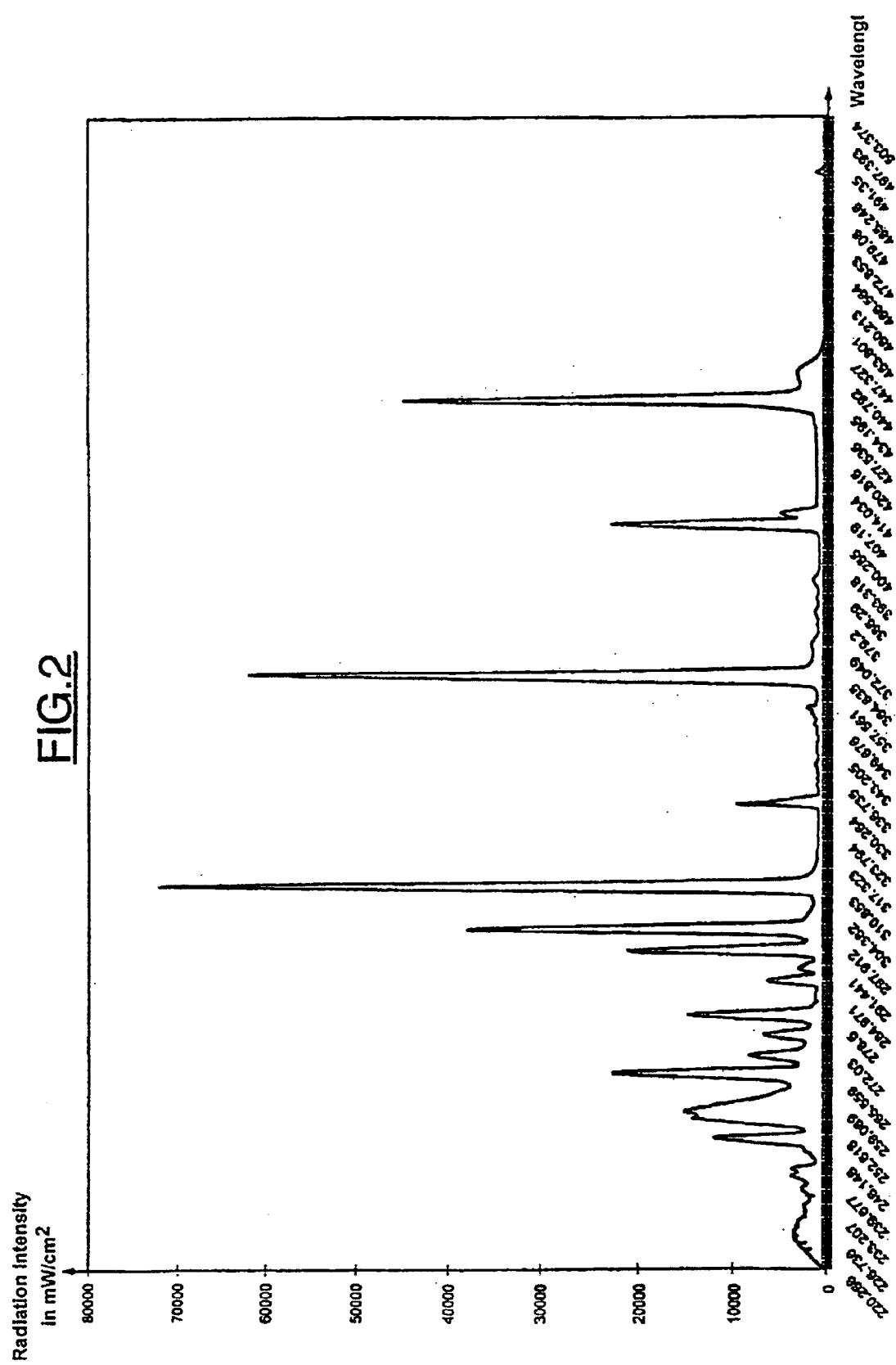

The description which follows refers to the annexed figures, which represent respectively:

FIG. 1—a schematic frontal view of a device for performing the step of irradiation of a transparent article, such as a lens, made from polycarbonate, according to the method of the invention; and FIG. 2—a graph of the radiation spectrum of the UV light source of the device of FIG. 1.

With reference to FIG. 1, a transparent polycarbonate article such as a lens 1, is transported by means of a conveyor belt 2 under a UV radiation source. The UV radiation source, for example a UV "D" lamp from the Company FUSION UV SYSTEM operating at 40% of its nominal power, comprises a bulb 3 and a reflector 4 focussing the light beam through a ground quartz screen 5 onto the lens 1 transported by the belt 2.

The UV radiation spectrum emitted by the UV "D" lamp operating at 40% of its nominal power is shown in FIG. 2.

With a belt speed of 15 cm/minute, the bulb 3 of the lamp situated at 10 cm above the belt and the UV "D" lamp operating at 40% of its nominal power, the width of the light beam falling on the lens is about 1 cm. The photodegradation energy received over 4 seconds by the lens is thus 16 J/cm$^2$ for the part of the UV radiation with wavelength $\leq 320$ nm and 5.73 J/cm$^2$ for the part of the UV radiation >320 nm.

By proceeding as described above, the polycarbonate material of the lens 1 is photodegraded, on the upper face of the article, over a depth of at least 1 $\mu$m.

The belt speed and thus the energy received by the lens may obviously be varied as a function of the lamp used and the desired depth of the photodegraded layer, the conditions being always maintained so that the depth of the photodegraded surface layer of the polycarbonate article is at least 1 $\mu$m and preferably at least 2 $\mu$m.

The belt speed is generally from 5 cm/minute to 60 cm/minute, preferably from 10 cm/minute to 30 cm/minute, to obtain the desired irradiation energies.

In all cases, the irradiation must be such that the temperature reached by the irradiated article remains less than the glass transition temperature (Tg) of the polycarbonate article.

Even more preferably, the lens is subjected to the irradiation treatment on the two principal faces to form two photodegraded surface layers of at least 1 $\mu$m thickness on each of the faces of the article 1.

After the irradiation treatment, the article 1 is coloured, for example by dipping in a colouring bath. The colouring bath is generally at a temperature of 85–100° C., and the time spent in the bath may vary from 10 minutes to 1 hour or more, and is in general from 30 minutes to 1 hour.

As an example, the table below shows the compositions of the colouring baths, and the colour obtained.

|  | Bath 1 Colour green | Bath 2 Colour grey | Bath 3 Colour brown |
|---|---|---|---|
| Water | 1 l | 1 l | 1 l |
| AKBS | 2 ml | 2 ml | 2 ml |
| Blue TERATOP ® GLF | 1.25 g | 3.95 g | 0.95 g |
| Yellow TERATOP ® GNL | 9.5 g | 8 g | 12 g |
| Red TERATOP ® 3G | 0.1 g | 0.75 g | 0.33 g |

AKBS: Alkyl benzene sulfonate
(These baths were obtained by mixing the different ingredients in water at 60° C.).

The colouring baths above were used at a temperature of 94° C.

After removal of the article from the colouring bath, the article is generally subjected to a treatment to wash off the excess of the colouring agent by immersion in an aqueous solution of polyethylene glycol at 55° C., then rinsed with deionised water at 55° C.

At this stage, the article is preferably subjected to a thermal treatment to stabilize the colour, in which the article is heated to 130° C. for 2 hours.

An example of the addition of a hard anti-abrasion coating to the coloured article obtained is now described.

The coloured article was pre-treated with a soda solution at 50° C. for 4 minutes, then immersed for 4 minutes in a primer composition, for example a polyurethane latex (Polyester/polyol from the BAXENDEN Company) at 5° C. After removal, the primer coat was dried at 80° C. for 20 minutes and let cool for 15 minutes.

The lens was then immersed for 4 minutes in a hard anti-abrasion coating composition at 5° C.

The hard anti-abrasion coating composition deposited was then baked for 3 hours at 100° C.

A coloured PC article was thus obtained with a primer coat and a layer of hard anti-abrasion coating on both faces.

The anti-abrasion coating composition was prepared as follows:

80.5 Parts of 0.1N HCl were added drop by drop to a solution containing 224 parts of GLYMO and 120 parts of DMDES.

The solution was stirred for 24 hours at room temperature, then 718 parts of colloidal silica 30% in methanol, 15 parts of aluminium acetylacetonate and 44 parts of ethylcellosolve were added. A small quantity of surface-active agent was also added.

The theoretical dry extract of the composition contained 13% of solid matter originating from the hydrolysed DMDES.

EXAMPLES

The colouring treatment described above was applied to finished surfaced lenses, made from bisphenol A homopolycarbonate, manufactured by GENTEX, with optical strength −4, −2, 0, +4 dioptres.

After the UV photodegradation treatment, the lenses were blown with compressed air to remove burrs and dust.

The lenses were subjected to the above UV photodegradation treatment on both faces, then to the colouring treatment by dipping for 20 minutes in the baths described above at 94° C.

After washing off the excess colouring agent, rinsing with water and thermal stabilization treatment as described above, the transmission index $\tau_v$ (in accordance with standards ISO/CIE 10526: 1991 and ISO/CIE 10527: 1991 and the draft standard ISO/DIS 8980-3 of 1997) was determined. For all the lenses, the transmission index $\tau_v$ was 17–30%, corresponding to classification 2 as determined in the draft standard ISO/DIS 8980-3.

What is claimed is:

1. A method for coloring a transparent article comprising two opposite principal faces and made of polycarbonate material, wherein the polycarbonate material is further defined as a polycarbonate material not containing polyester groups, the method comprising:

a) photodegrading the polycarbonate material of the transparent article by irradiation of at least one of the principal faces of the article with UV radiation to produce at least one photodegraded surface layer of polycarbonate material with a thickness of at least 1 µm, wherein the UV radiation is further defined as comprising at least 50% energy of irradiation originating from radiation with wavelength equal to or less than 320 nm; and b) placing a coloring agent in contact with the at least one photodegraded surface layer, so that the coloring agent diffuses into the photodegraded surface layer.

2. The method of claim 1, wherein the at least one photodegraded surface layer of polycarbonate material has a thickness of at least 2 µm.

3. The method of claim 1, wherein the at least one photodegraded surface layer has a thickness of 2 to 20 µm.

4. The method of claim 3, wherein the at least one photodegraded surface layer has a thickness of 2 to 10 µm.

5. The method of claim 1, wherein the coloring agent diffuses to a thickness of at least 1 µm in the at least one photodegraded surface layer.

6. The method of claim 5, wherein the coloring agent diffuses to a thickness of at least 2 µm in the at least one photodegraded surface layer.

7. The method of claim 1, wherein the coloring agent is diffused throughout the entire thickness of the at least one photodegraded surface layer.

8. The method of claim 1, further defined as comprising:

a) photodegrading both of the two opposite principal faces of the article to produce two photodegraded surface layers of the polycarbonate material, each having a thickness of at least 1 µm; and b) placing the coloring agent in contact with the two opposite principal faces of the article, so that the coloring agent diffuses into both of the two photodegraded surface layers.

9. The method of claim 1, wherein at least 60% of the energy of irradiation originates from radiation with wavelength equal to or less than 320 nm.

10. The method of claim 9, wherein at least 65% of the energy of irradiation originates from radiation with wavelength equal to or less than 320 nm.

11. The method of claim 1, wherein the energy of irradiation originating from radiation with wavelength equal to or less than 320 nm is from 2.4 J/cm$^2$ to 48 J/cm$^2$.

12. The method of claim 11, wherein the energy of irradiation originating from radiation with wavelength equal to or less than 320 nm is from 10 J/cm$^2$ to 30 J/cm$^2$.

13. The method of claim 1, wherein the UV radiation comprises radiation with wavelength above 320 nm and energy of the irradiation originating from the radiation with wavelength above 320 nm is from 0.9 J/cm$^2$ to 15 J/cm$^2$.

14. The method of claim 13, wherein the energy of the irradiation originating from the radiation with wavelength above 320 nm is from 2 J/cm$^2$ to 8 J/cm$^2$.

15. The method of claim 1, wherein the polycarbonate material is selected from the group consisting of bisphenol A homopolycarbonates.

16. The method of claim 1, wherein the polycarbonate material comprises a UV absorber.

17. The method of claim 1, wherein placing the coloring agent in contact with the at least one photodegraded surface layer comprises dipping the article in a coloring bath comprising the coloring agent.

18. The method of claim 17, wherein the coloring bath comprises a surface-active alkyl benzene sulfonate.

19. The method of claim 1, further defined as comprising fixing the coloring agent with a thermal stabilization treatment.

20. The method of claim 19, wherein the thermal stabilization treatment comprises heating the article to a temperature of 100 to 140° C. for 1 hour or more.

21. The method of claim 20, wherein the thermal stabilization treatment consists of heating the article to 130° C. for 2 hours.

22. The method of claim 1, wherein the coloring agent is selected from the group consisting of azo dyes, anthraquinone dyes, and mixtures thereof.

23. The method of claim 1, wherein the coloring agent is selected from the group consisting of photochromic compounds and mixtures thereof.

24. The method of claim 1, further comprising applying a layer of an anti-abrasion material onto at least one photodegraded surface layer.

25. The method of claim 24, wherein the anti-abrasion material is a (meth)acrylic resin.

26. The method of claim 24, further defined as comprising depositing on the at least one photodegraded surface layer a primer layer, prior to the deposit of the layer of anti-abrasion material.

27. The method of claim 26, wherein the primer is selected from the group consisting of thermoplastic polyurethanes, the thermosetting polyurethanes, the poly (meth)acrylic latexes, and the polyurethane latexes.

28. The method of claim 24, wherein the anti-abrasion material results from the setting of a hydrolysate of epoxysilane.

29. The method of claim 28, wherein the hydrolysate comprises a colloidal filler selected from the group consisting of $SiO_2$, $TiO_2$ and $Sb_2O_5$.

30. The method of claim 24, further defined as comprising depositing of a layer of an anti-reflection material onto the layer of anti-abrasion material.

31. The method of claim 1, wherein the article is further defined as a optical or ophthalmic article.

32. The method of claim 31, wherein the article is further defined as a spectacle lens.

* * * * *